(12) United States Patent
Nomura et al.

(10) Patent No.: US 10,252,572 B2
(45) Date of Patent: Apr. 9, 2019

(54) AIRLESS TIRE

(71) Applicant: SUMITOMO RUBBER INDUSTRIES LTD., Kobe-shi (JP)

(72) Inventors: Seiji Nomura, Kobe (JP); Wako Iwamura, Kobe (JP); Makoto Sugiya, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 0 days.

(21) Appl. No.: 14/873,384

(22) Filed: Oct. 2, 2015

(65) Prior Publication Data
US 2016/0096400 A1   Apr. 7, 2016

(30) Foreign Application Priority Data
Oct. 2, 2014   (JP) .................................. 2014-204193

(51) Int. Cl.
| | |
|---|---|
| *B60C 7/14* | (2006.01) |
| *B60B 9/04* | (2006.01) |
| *B60B 9/10* | (2006.01) |
| *B60B 9/26* | (2006.01) |
| *B60C 7/22* | (2006.01) |

(52) U.S. Cl.
CPC ............... *B60C 7/143* (2013.01); *B60B 9/04* (2013.01); *B60B 9/10* (2013.01); *B60B 9/26* (2013.01); *B60C 7/22* (2013.01); *B60C 2007/146* (2013.01)

(58) Field of Classification Search
CPC ........ B60C 2007/107; B60C 2007/146; B60C 7/14; B60C 7/143; B60C 7/18; B60C 7/0246; B60C 7/0261; B60C 7/22; B60L 39/26; B60B 9/26; B60B 9/04; B60B 9/10
See application file for complete search history.

(56) References Cited

U.S. PATENT DOCUMENTS

| | | | | |
|---|---|---|---|---|
| 7,143,797 B2 * | 12/2006 | Vannan | ..................... | B60C 7/10 |
| | | | | 152/11 |
| 7,650,919 B2 * | 1/2010 | Rhyne | ....................... | B60C 7/18 |
| | | | | 152/11 |

(Continued)

FOREIGN PATENT DOCUMENTS

| | | | | |
|---|---|---|---|---|
| JP | 2007112243 A | * | 5/2007 | ............... B60C 7/14 |
| JP | 2008-260514 A | | 10/2008 | |

*Primary Examiner* — Kip T Kotter
*Assistant Examiner* — Scott A Browne
(74) *Attorney, Agent, or Firm* — Oblon, McClelland, Maier & Neustadt, L.L.P.

(57) ABSTRACT

An airless tire includes a tread ring, a hub positioned on radially inner side of the ring, and a spoke structure including polymer material and connecting the ring and hub, the structure including spoke pieces arrayed in circumferential direction. Each spoke piece has a tread connecting portion, a hub connecting portion, and a spoke curved portion between the tread and hub connecting portions, each spoke piece has straight radial length LSb of at least 1.05 times straight radial length LSa and curved radial length LLb of at least 1.03 times LSb when positioned at 0° on coordinate around the tire axis where a perpendicular line extending vertically upward from the tire axis is set 0°, LSb is measured along the base line under base-load condition, LSa is measured along the base line under no-load condition, and LLb is measured along a curve of each spoke piece under the base-load condition.

20 Claims, 6 Drawing Sheets

(56) References Cited

U.S. PATENT DOCUMENTS

| | | | | |
|---|---|---|---|---|
| 8,991,455 B2* | 3/2015 | Cron | ............ | B60C 7/10 152/324 |
| 2006/0113016 A1* | 6/2006 | Cron | ............ | B60C 7/18 152/11 |
| 2009/0211674 A1* | 8/2009 | Hanada | ............ | B60C 7/12 152/53 |
| 2009/0294000 A1* | 12/2009 | Cron | ............ | B60C 7/18 152/5 |
| 2011/0079335 A1* | 4/2011 | Manesh | ............ | B60C 7/12 152/310 |
| 2014/0000777 A1* | 1/2014 | Choi | ............ | B60C 7/18 152/246 |

* cited by examiner

PRIOR ART

FIG. 6A

PRIOR ART

AIRLESS TIRE

CROSS-REFERENCE TO RELATED APPLICATIONS

The present application is based upon and claims the benefit of priority to Japanese Patent Application No. 2014-204193, filed Oct. 2, 2014, the entire contents of which are incorporated herein by reference.

BACKGROUND OF THE INVENTION

Field of the Invention

The present invention relates to an airless tire with enhanced riding comfort.

Description of Background Art

JP2008-260514A describes an airless tire in which spoke is formed by radially arranging multiple plate-like spoke pieces between tread ring and hub. The entire contents of this publication are incorporated herein by reference.

SUMMARY OF THE INVENTION

According to one aspect of the present invention, an airless tire includes a tread ring having a cylindrical form, a hub positioned on a radially inner side of the tread ring and formed to be fixed to an axle, and a spoke structure including a polymer material and connecting the tread ring and the hub, the spoke structure including spoke pieces arrayed in a circumferential direction. Each of the spoke pieces has a tread connecting portion connected to an inner circumferential surface of the tread ring, a hub connecting portion connected to an outer circumferential surface of the hub, and a spoke curved portion between the tread connecting portion and the hub connecting portion such that the tread connecting portion and the hub connecting portion are positioned on a base line extending radially from a tire axis and the spoke curved portion is veering off the base line in the circumferential direction, each of the spoke pieces has a straight radial length LSb of at least 1.05 times a straight radial length LSa and a curved radial length LLb of at least 1.03 times the straight length LSb when positioned at 0° on a coordinate around the tire axis where a perpendicular line extending vertically upward from the tire axis is set 0°, the straight radial length LSb is measured along the base line under a base-load condition which is 60% of a normal load exerted on the airless tire, the straight radial length LSa is measured along the base line under a no-load condition, and the curved radial length LLb is measured along a curve of each of the spoke pieces under the base-load condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
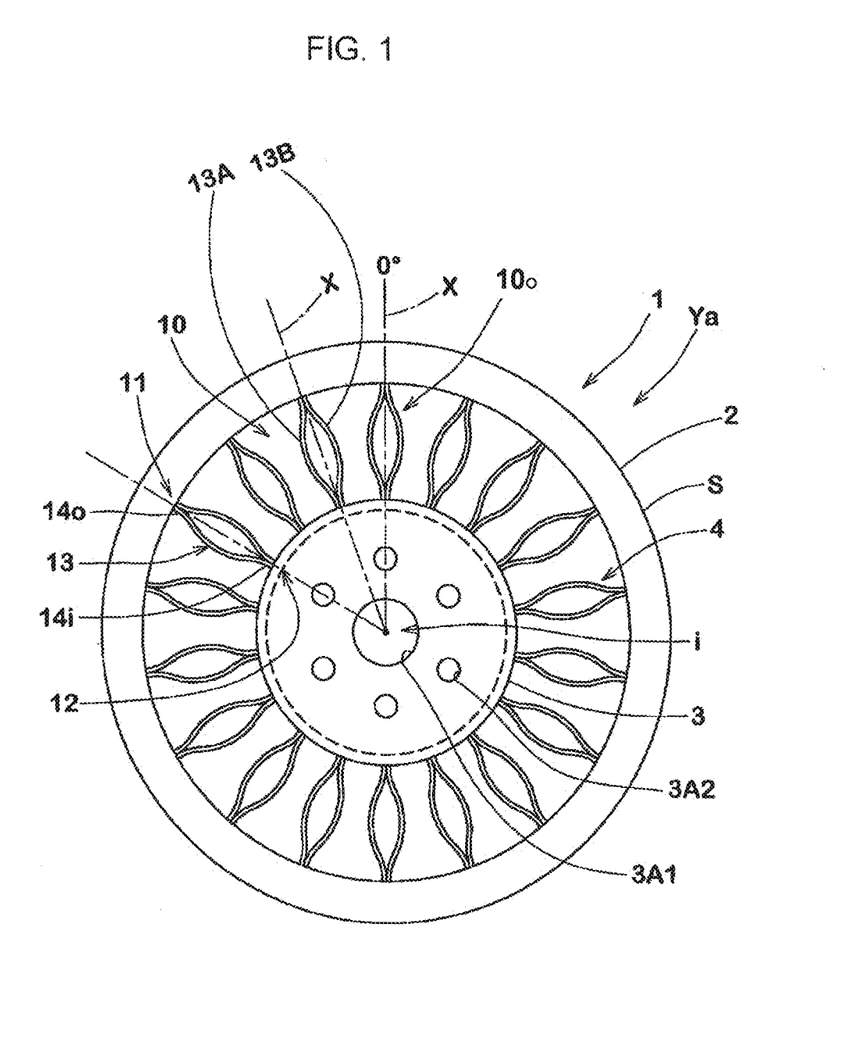
FIG. 1 is a front view of a no-load airless tire related to the present invention.
Figure 2:
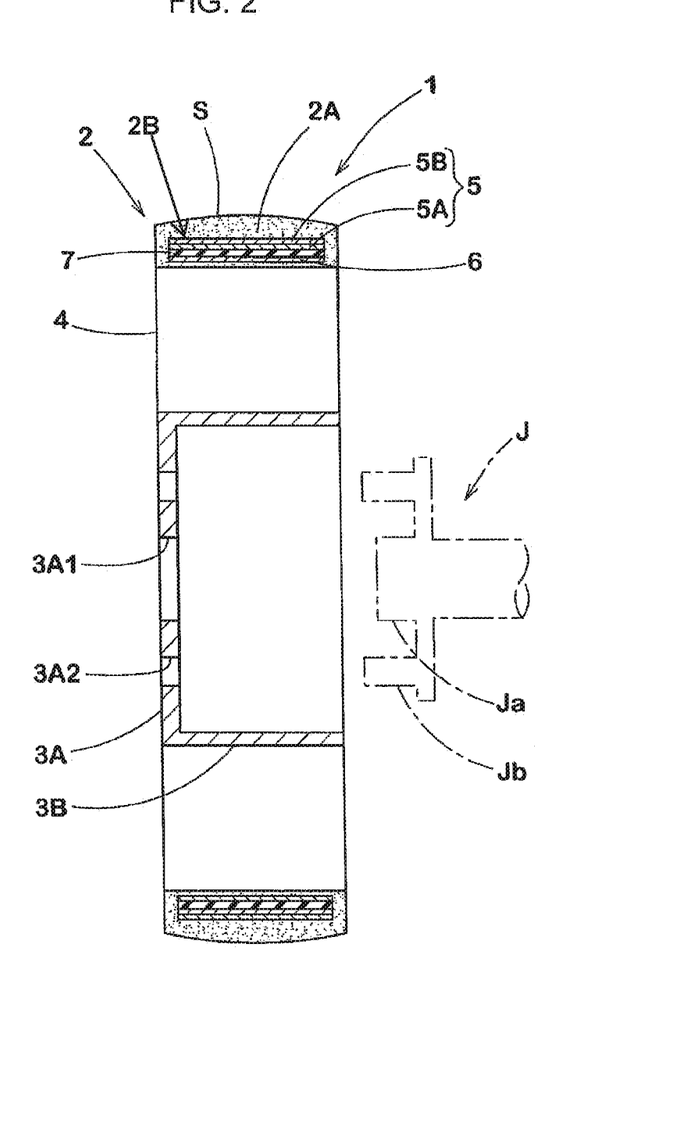
FIG. 2 is a cross-sectional view of the tire shown in FIG. 1.

As shown in FIGS. 1 and 2, airless tire 1 of the present embodiment has cylindrical tread ring 2 having contact patch (S), hub 3 positioned on the radially inner side of tread ring 2 and fixed to axle (J), and spoke 4 made of a polymer material and connecting tread ring 2 and hub 3. In the present embodiment, airless tire 1 is manufactured to be mounted on a passenger car.

Tread ring 2 corresponds to the tread of a pneumatic tire, and is provided with tread rubber portion (2A) as contact patch (S) and reinforcing cord layer (2B) positioned on the radially inner side of the contact patch.

Tread rubber portion (2A) is preferred to be formed with a rubber composition capable of gaining excellent traction on the ground and achieving excellent wear resistance. Tread grooves (not shown) are formed in various patterns on contact patch (S) to improve wet performance.

Reinforcing cord layer (2B) of the present embodiment includes outer breaker 5 positioned on the radially outer side and inner breaker 6 positioned on the radially inner side. Shearing rubber layer 7 made of a highly elastic rubber is positioned between the breakers.

Outer breaker 5 is formed with multiple plies, two outer plies (5A, 5B) in the present embodiment, made of highly elastic reinforcing cords such as steel cords that are positioned to incline at 5~85 degrees, preferably at 10-35 degrees, relative to a tire circumferential direction. Outer breaker 5 is formed by laminating two plies; reinforcing cords in a ply inclines in a different direction from those in the other ply so as to cross each other. In addition, inner breaker 6 is formed with one or more plies, one inner ply in the present embodiment, made of highly elastic reinforcing cords such as steel cords that are helically wound in a tire circumferential direction.

Shearing rubber layer 7 is made of a highly elastic rubber having a complex elastic modulus $E^*_{70}$ of 70 MPa or greater, preferably 90 MPa or greater, when measured at 70° C., an initial strain of 10% and a dynamic strain of 2%. When both sides of such a highly elastic rubber are sandwiched by outer breaker 5 and inner breaker 6, the rigidity of tread ring 2 is significantly enhanced. Accordingly, an excellent rolling motion of the tire is secured.

Hub 3 corresponds to a tire wheel. In the present embodiment, hub 3 is provided with disc portion (3A) fixed to axle (J), and cylindrical spoke coupling portion (3B) integrated with disc portion (3A) on its radially outer edge. Hub hole (3A1) for inserting front end (Ja) of axle (J) is formed in the center of disc portion (3A). Around hub hole (3A1), multiple bolt insertion holes (3A2) are formed so that bolts (Jb) on the axle side are fastened with nuts. Hub 3 is preferred to be made of metallic material such as steel, aluminum alloys and magnesium alloys, the same for tire wheels.

Next, spoke 4 is formed to be integrated with tread ring 2 and hub 3 by cast molding a polymer material. Examples of a polymer material are thermoplastic resins and thermosetting resins. For safety reasons, thermosetting resins are preferred; for example, epoxy resins, phenolic resins, urethane resins, silicone resins, polyimide resins, melamine resins and the like. Especially, urethane resins are more preferable because of their excellent elastic properties.

Spoke 4 includes multiple plate-like spoke pieces 10 arrayed at equal intervals in a tire circumferential direction. As shown in FIG. 1, each spoke piece 10 is provided with tread connecting portion 11 where its radially outer edge is connected to the inner circumferential surface of tread ring 2, along with hub connecting portion 12 where its radially inner edge is connected to the outer circumferential surface of hub 3. Tread connecting portion 11 and hub connecting portion 12 are positioned along base line (X) radially extending from tire axis (i).

In addition, spoke piece 10 is provided with curved portion 13 positioned between tread connecting portion 11 and hub connecting portion 12 to extend in a curve so as to veer off base line (X) in a tire circumferential direction.

Spoke curved portion 13 of the present embodiment includes first curved portion (13A) extending in a curve to veer off base line (X) in a circumferential direction and second curved portion (13B) extending in a curve to veer off base line (X) in the opposite circumferential direction. First and second curved portions (13A, 13B) of a spoke piece are set in line symmetry at base line (X). In the present embodiment, first and second curved portions (13A, 13B) are curved in a substantially arc shape. However, they may be shaped like the caret symbol, for example.

In the present embodiment, spoke piece 10 includes spoke outer base (14o) that extends along base line (X) between tread connecting portion 11 and the radially outer edge of spoke curved portion 13 as well as spoke inner base (14i) that extends along base line (X) between hub connecting portion 12 and the radially inner edge of spoke curved portion 13.

When airless tire 1 is set at the coordinate around the tire axis where a perpendicular line that extends vertically upward from tire axis (i) is set as 0°, spoke piece $10_0$ positioned at 0° is specified as follows under no-load condition (Ya) (see FIG. 4A) and under base-load condition (Yb) (see FIG. 4B).

Figure 4A:
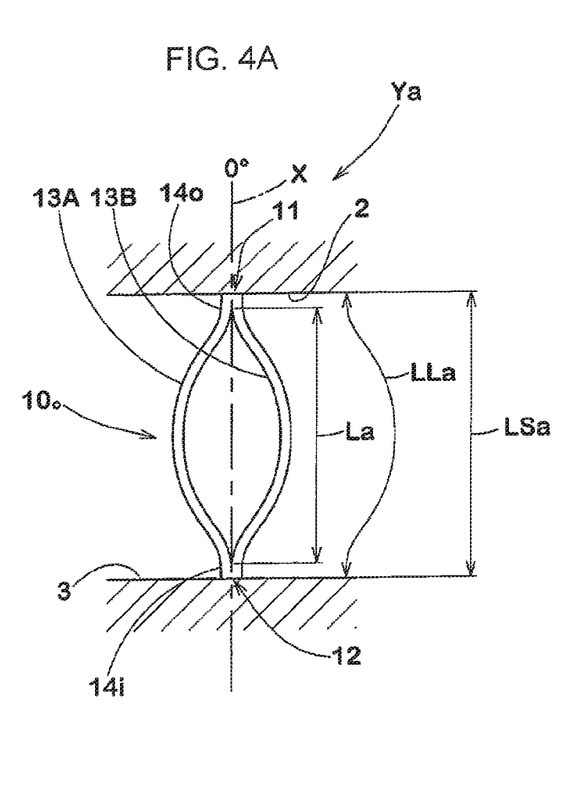
FIG. 4A is a view schematically showing a spoke piece positioned at 0° of a tire under no-load condition in a developed view where a tire radial direction is set as the vertical axis and a tire circumferential direction as the horizontal axis, and 4B is a view schematically showing a spoke piece positioned at 0° of a tire under base-load condition in a developed view where a tire radial direction is set as the vertical axis and a tire circumferential direction as the horizontal axis.

FIG. 4A shows spoke piece $10_0$ positioned at 0° of airless tire 1 under no-load condition (Ya) in a developed view where a tire radial direction is set as the vertical axis and a tire circumferential direction as the horizontal axis. FIG. 4B shows spoke piece $10_0$ positioned at 0° of airless tire 1 under base-load condition (Yb) in a developed view where a tire radial direction is set as the vertical axis and a tire circumferential direction as the horizontal axis.

Figure 4B:
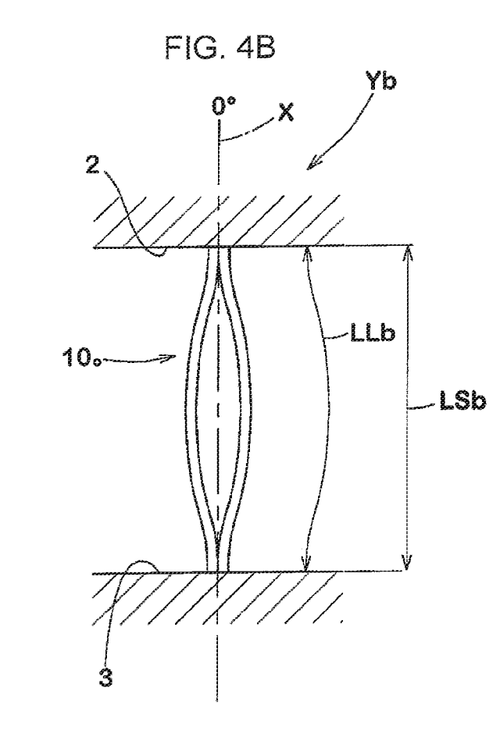

As shown in FIGS. 4A and 4B, spoke piece $10_0$ at 0° is set so that straight radial length (LSb) of spoke piece $10_0$ measured along base line (X) under base-load condition (Yb) is at least 1.05 times the straight radial length (LSa) of spoke piece $10_0$ measured along base line (X) under no-load condition (Ya). In addition, spoke piece $10_0$ at 0° is set so that a curved radial length (LLb) measured along the curve of spoke piece $10_0$ under base-load condition (Yb) is at least 1.03 times the straight length (LSb).

Here, base-load condition (Yb) (see FIG. 4B) means condition where load (F) that is 60% of the normal load is exerted on airless tire 1, whereas no-load condition (Ya) (see FIG. 4A) means no load is exerted on airless tire 1. "Normal load" indicates the load on a pneumatic tire with a tire size corresponding to airless tire 1 as specified in the regulatory system that include standards for each pneumatic tire: it is specified as "Maximum Load Capacity" by JATMA, maximum value listed in the table "Tire Load Limits at Various Cold Inflation Pressures" by TRA, and "Load Capacity" by ETRTO.

By setting straight length (LSb) to be at least 1.05 times the straight length (LSa), the vertical motion of the axle when the tire runs over a rough road surface is reduced. In addition, setting curved length (LLb) to be at least 1.03 times the straight length (LSb) provides an additional 3% or greater elongation for spoke piece 10 before it stretches fully straight. For example, when the tire runs over a bump, impact from the bump is absorbed and mitigated significantly. Accordingly, riding comfort is enhanced through multiple effects of the above settings. From such viewpoints, straight length (LSb) is more preferred to be at least 1.07 times the straight length (LSa), and curved length (LLb) is more preferred to be at least 1.05 times the straight length (LSb).

The upper limit of straight length (LSb) is not restricted to a certain value. However, considering steering stability, it is preferred to be no greater than 1.3 times, more preferably no greater than 1.2 times, the straight length (LSa). In addition, the upper limit of curved length (LLb) is not restricted to a certain value either, but it is preferred to be no greater than 1.2 times, more preferably no greater than 1.1 times, the straight length (LSb), considering steering stability.

In spoke piece 10, tread connecting portion 11 and hub connecting portion 12 are positioned along base line (X). Thus, when spoke curved portion 13 undergoes bending deformation, or recovering from the bending deformation, longitudinal force derived from such deformation is prevented. Accordingly, steering stability is maintained.

If the percentage of spoke piece 10 occupied by spoke curved portion 13 is too small, the degree of deformation of spoke curved portion 13 increases, and durability is reduced accordingly. Thus, straight radial length (LSa) of spoke curved portion 13 measured along base line (X) under no-load condition is preferred to be at least 70% of the entire straight length (LSa) of spoke piece 10.

In spoke piece $10_0$ positioned at 0°, curved length (LLb) is no greater than 1.005 times the curved radial length (LLa) measured along the curve of spoke piece $10_0$ under no-load condition. Namely, when observed under base-load condition (Yb) and no-load condition (Ya), hardly any elongation or compression is present in a length direction of spoke piece $10_0$ itself. Accordingly, the durability of spoke piece $10_0$ is enhanced.

When spoke curved portion 13 includes first and second curved portions (13A, 13B), curved lengths (LLa, LLb) are measured along the curve of either first or second curved portion (13A or 13B) of the spoke piece.

Figure 5:
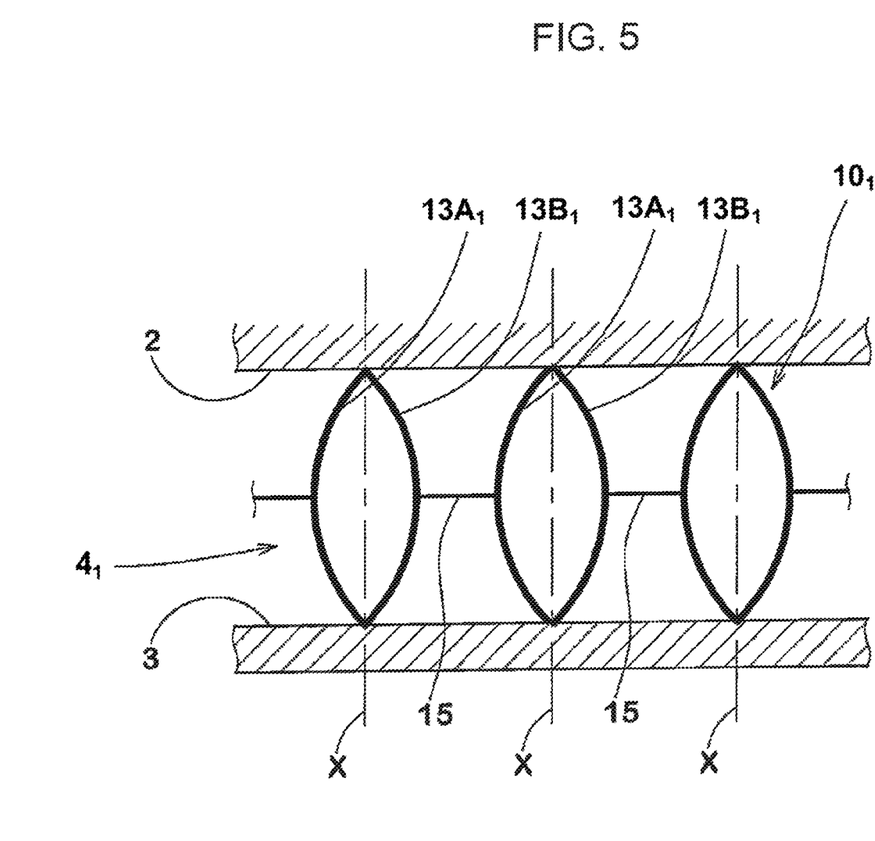
FIG. 5 is a view schematically showing another example of the spoke in a developed view where a tire radial direction is set as the vertical axis and a tire circumferential direction as the horizontal axis.

As schematically shown in FIG. 5, spoke piece $10_1$ may also be formed only with spoke curved portion 13 by eliminating spoke inner and outer bases (14i, 14o). In such a structure, the radially outer edge of spoke curved portion 13 corresponds to tread connecting portion 11, and the radially inner edge of spoke curved portion 13 to hub connecting portion 12.

Figure 3:
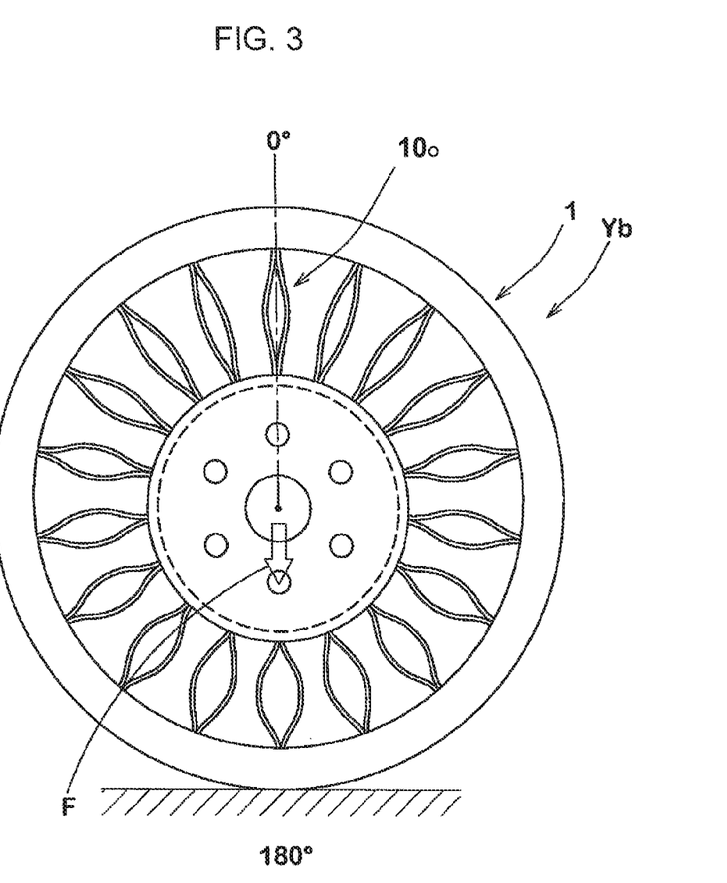
FIG. 3 is a front view of an airless tire under base-load condition.

Also, spoke $4_1$ is preferred to have joint portion 15 to connect first curved portion $13A_1$ of a spoke piece $10_1$ and second curved portion $13B_1$ of another spoke piece $10_1$ positioned adjacent in a circumferential direction. By so setting, the load exerted on spoke $4_1$ is dispersed to and supported by both spoke pieces $10_1$ and joint portions 15, and the durability of the spoke is thereby enhanced. Forming joint portions 15 may also apply to spoke 4 shown in FIGS. 1 and 3 (where spoke piece 10 is structured to have spoke inner and outer bases ($14i$, $14o$) and spoke curved portion 13).

When joint portion 15 is provided, it is more preferable for bending deformation of spoke curved portion 13, if complex elastic modulus $E^*_1$ of first and second curved portions ($13A_1$, $13B_1$) of a spoke is set at least 1.5 times the complex elastic modulus $E^*_2$ of joint portion 15, or if the thickness of each of first and second portions ($13A_1$, $13B_1$) is set at least 1.5 times the thickness of joint portion 15.

Spoke curved portion 13 may be formed by using only spoke first curved portion (13A). Alternatively, an S-shaped curved portion may also be employed.

So far, especially preferred embodiments of the present invention are described. However, the present invention is not limited to those shown in the accompanying drawings, and various modifications are possible for carrying out the present invention.

EXAMPLES

Airless test tires having the base structure shown in FIGS. 1 and 2 (corresponding to a size 145/70R12) were prepared according to the specifications shown in Table 1. Those tires were mounted on a vehicle and the riding comfort was evaluated by actually driving the vehicle. Those tires were prepared to have substantially the same structure except for the spokes. Each spoke was formed to be integrated with the tread ring and the hub by cast molding urethane resin (thermosetting resin).

Riding Comfort

Test tires were mounted on four wheels of a vehicle (super-compact EV: brand name COMS). Then, on a rough dry asphalt road surface, a Belgian road (cobblestone road), a bitumen road (gravel road) or the like, an unaccompanied driver drove the vehicle and conducted sensory evaluation of riding comfort, in particular, the sensation of bumpy riding, bouncing, and damping. The results are rated on a scale from 1 to 10. The greater the rating, the more outstanding the riding comfort.

Figure 6A:
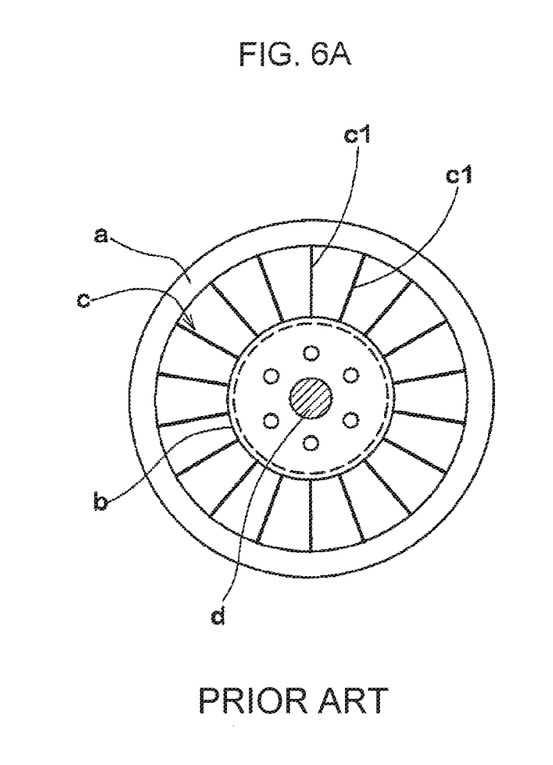
FIGS. 6A and 6B are front views showing a conventional airless tire under no-load and base-load condition respectively.
Figure 6B:
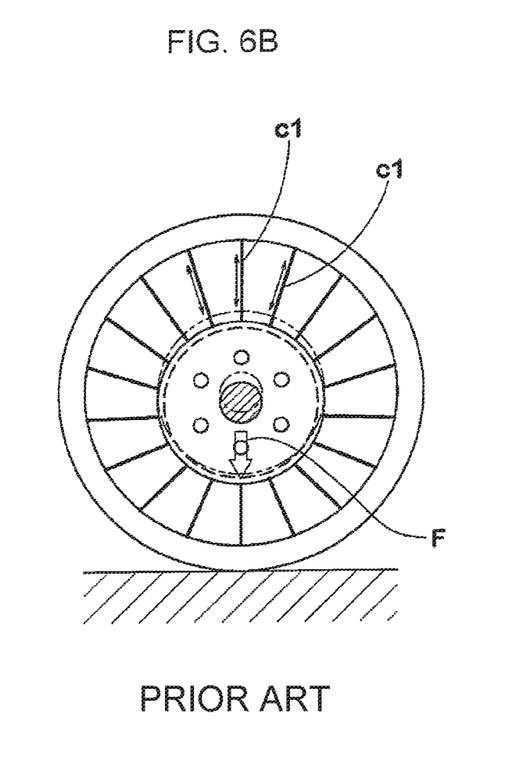

Regarding the tire having the above structure, hub (b) and axle (d) are suspended by spoke pieces (c1) positioned on their upper side, while load (F) exerted on axle (d) is supported by the longitudinal tensile strength of spoke pieces (c1).

Accordingly, when a tire runs over a rough road surface, since it is difficult to sufficiently absorb the roughness by a change in the length of spoke piece (c1), significant vertical motion is exerted on axle (d), and strong impact is transmitted from the road surface to axle (d). As a result, riding comfort is lowered. In addition, when the rigidity of tread ring (a) is reduced so that the road roughness is absorbed by a change in the shape of tread ring (a), the degree of roundness of the tire is sacrificed and a smooth rolling motion is hard to maintain.

An airless tire according to an embodiment of the present invention is capable of enhancing riding comfort while maintaining high rigidity of the tread ring and securing the smooth rolling motion of the tire.

One aspect of the present invention is an airless tire, structured to have a cylindrical tread ring with a contact patch, a hub positioned on the radially inner side of the tread ring and fixed to an axle, and a spoke made of a polymer material and connecting the tread ring and the hub. The spoke includes multiple spoke pieces arrayed in a circumferential direction. On a base line extending radially from the tire axis, each spoke piece is structured to have a tread connecting portion connected to the inner circumferential surface of the tread ring and a hub connecting portion connected to the outer circumferential surface of the hub, and between the tread connecting portion and the hub connecting portion, a spoke curved portion is further formed to veer off the base line in a circumferential direction.

At coordinate around the tire axis where a perpendicular line extending vertically upward from the tire axis is set as 0°, a spoke piece positioned at 0° is set so that straight radial length (LSb) of the spoke piece measured along the base line under base-load condition, that is, when 60% of a normal load is exerted on the tire, is at least 1.05 times the straight radial length (LSa) of the spoke piece measured along the base line under no-load condition. In addition, a spoke piece at 0° is set so that curved radial length (LLb) measured along the curve of the spoke piece under base-load condition is at least 1.03 times the straight length (LSb).

In an airless tire according to an embodiment of the present invention, a spoke piece at 0° is preferred to be set so that the curved radial length (LLb) is no greater than

TABLE 1

|  | Comp. Example 1 | Comp. Example 2 | Example 1 | Example 2 | Example 3 | Example 4 | Example 5 |
|---|---|---|---|---|---|---|---|
| Spoke | FIG. 6 |  |  | FIG. 1 |  |  |  |
| Spoke Curved Portion | not formed |  |  | Formed |  |  |  |
| Joint Portion | not formed |  | Formed |  |  |  | not formed |
| Ratio LSb/LSa | 1.005 | 1.03 | 1.05 | 1.07 | 1.05 | 1.05 | 1.05 |
| Ratio LLb/LSb | 1.005 | 1.03 | 1.03 | 1.03 | 1.01 | 1.05 | 1.05 |
| Ratio LLb/LLa | 1.005 | 1.005 | 1.005 | 1.005 | 1.005 | 1.005 | 1.005 |
| Riding Comfort | 4 | 6 | 8 | 9 | 5 | 10 | 10 |

As is shown in Table 1, tires of Example 1-4 are confirmed to be excellent in riding comfort.

For a pneumatic tire filled with air at an inflation pressure to support a load, it is almost impossible to totally avoid punctures. FIG. 6A shows a tire under no-load condition, and FIG. 6B shows a tire with a load exerted thereon.

1.005 times the curved radial length (LLa) measured along the curve of the spoke piece under no-load condition.

In an airless tire according to an embodiment of the present invention, the spoke curved portion is preferred to have a first curved portion that extends in a curve to veer off from the base line in a circumferential direction and a second curved portion that extends in a curve to veer off from the base line in the opposite circumferential direction.

In an airless tire according to an embodiment of the present invention, the spoke is preferred to have a joint portion connecting the first curved portion of a spoke piece and the second curved portion of another spoke piece positioned adjacent in a circumferential direction.

In an airless tire according to an embodiment of the present invention, complex elastic modulus $E^*_1$ of the first and second curved portions of a spoke is preferred to be at least 1.5 times the complex elastic modulus $E^*_2$ of the joint portion, or the thickness of each of first and second curved portions is preferred to be at least 1.5 times the thickness of the joint portion.

In an airless tire according to an embodiment of the present invention, the spoke piece may include a spoke outer base that extends along the base line between the tread connecting portion and the radially outer edge of the spoke curved portion and a spoke inner base that extends along the base line between the hub connecting portion and the radially inner edge of the spoke curved portion.

In an airless tire according to an embodiment of the present invention, the spoke piece may also be structured in a way that the radially outer edge of the spoke curved portion is set as the tread connecting portion and the radially inner edge of the spoke curved portion is set as the hub connecting portion.

As described above, each spoke piece has a tread connecting portion and a hub connecting portion that are set on a base line extending radially from the tire axis. Moreover, between the tread connecting portion and hub connecting portion, each spoke piece has a spoke curved portion that extends in a curve to veer off the base line in a tire circumferential direction.

Accordingly, when the tire runs over a rough road surface, the roughness of the road is absorbed through bending deformation of the spoke curved portions so as to reduce the vertical motion of the axle. Accordingly, the impact from the road surface is mitigated and riding comfort is enhanced. Especially, when a spoke piece is positioned at 0°, straight length (LSb) of a spoke piece under base-load condition is set at least 1.05 times the straight length (LSa) of the spoke piece under no-load condition. By so setting, vertical motion of the axle is reduced when the tire runs over a rough road surface. In addition, curved length (LLb) of a spoke piece under base-load condition is set at least 1.03 times the straight length (LSb) of the spoke piece under base-load condition. Such a setting provides an additional 3% or greater elongation of the spoke piece before it stretches fully straight. For example, when the tire runs over a bump, the impact is absorbed and mitigated highly effectively. Accordingly, riding comfort is enhanced through multiple effects of the above settings.

The tread connecting and hub connecting portions are positioned along the base line. Thus, when a spoke curved portion undergoes bending deformation and recovers from the bending deformation, longitudinal force derived from the deformation is prevented.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
   a tread ring having a cylindrical form;
   a hub positioned on a radially inner side of the tread ring and configured to be fixed to an axle; and
   a spoke structure comprising a polymer material and connecting the tread ring and the hub, the spoke structure comprising a plurality of spoke pieces arrayed in a circumferential direction,
   wherein each of the spoke pieces comprises a tread connecting portion connected to an inner circumferential surface of the tread ring, a hub connecting portion connected to an outer circumferential surface of the hub, and a spoke curved portion formed between the tread connecting portion and the hub connecting portion such that the tread connecting portion and the hub connecting portion are positioned on a base line extending radially from a tire axis and the spoke curved portion has a first curved portion extending in a curve veering off from the base line in the circumferential direction and a second curved portion extending in a curve veering off from the base line in an opposite circumferential direction to set the first and second curved portions in a line symmetry at the base line, each of spoke pieces comprises a first portion and a second portion such that the first portion extends from the hub connection portion to the tread connection portion and includes the first curved portion and that the second portion extends from the hub connection portion to the tread connection portion and includes the second curved portion, and each of the spoke pieces has a straight radial length LSb of at least 1.05 times a straight radial length LSa and a curved radial length LLb of at least 1.03 times the straight length LSb when positioned at 0° on a coordinate around the tire axis where a perpendicular line extending vertically upward from the tire axis is set as 0° on the coordinate, the straight radial length LSb is measured from the hub connection portion to the tread connection portion along the base line under a base-load condition which is 60% of a normal load exerted on the airless tire where the normal load corresponds to a normal load on a pneumatic tire with a tire size corresponding to the airless tire, the straight radial length LSa is measured from the hub connection portion to the tread connection portion along the base line under a no-load condition, and the curved radial length LLb is measured from the hub connection portion to the tread connection portion along a curve of each of the spoke pieces under the base-load condition.

2. The airless tire according to claim 1, wherein when each of the spoke pieces is at 0° on the coordinate, each of the spoke pieces has the curved radial length LLb of no greater than 1.005 times a curved radial length LLa, where the curved radial length LLa is measured along a carve of each of the spoke pieces under the no-load condition.

3. The airless tire according to claim 1, wherein each of the spoke pieces has the straight radial length LSb of at least 1.07 times the straight radial length LSa and the curved radial length LLb of at least 1.05 times the straight length LSb when positioned at 0° on the coordinate around the tire axis.

4. The airless tire according to claim 1, wherein the spoke structure has a joint portion formed such that the joint portion is connecting the first curved portion of one spoke piece and the second curved portion of another spoke piece positioned adjacent to the one spoke piece in the circumferential direction.

5. The airless tire according to claim 4, wherein the first and second curved portions of a spoke piece has a complex elastic modulus $E^*_1$ which is set at least 1.5 times a complex elastic modulus $E^*_2$ of the joint portion.

6. The airless tire according to claim 4, wherein each of the first and second curved portions of a spoke piece has a thickness which is set at least 1.5 times a thickness of the joint portion.

7. The airless tire according to claim 1, wherein each of the spoke pieces comprises a spoke outer base extending along the base line between the tread connecting portion and a radially outer edge of the spoke curved portion, and a spoke inner base extending along the base line between the hub connecting portion and a radially inner edge of the spoke curved portion.

8. The airless tire according to claim 1, wherein each of the spoke pieces has a radially outer edge of the spoke curved portion which is set as the tread connecting portion and a radially inner edge of the spoke curved portion which is set as the hub connecting portion.

9. The airless tire according to claim 4, wherein when each of the spoke pieces is at 0° on the coordinate, each of the spoke pieces has the curved radial length LLb of no greater than 1.005 times a curved radial length LLa, where the curved radial length LLa is measured along a curve of each of the spoke pieces under the no-load condition.

10. The airless tire according to claim 3, wherein the spoke structure has a joint portion formed such that the joint portion is connecting the first curved portion of one spoke piece and the second curved portion of another spoke piece positioned adjacent to the one spoke piece in the circumferential direction.

11. The airless tire according to claim 9, wherein the first and second curved portions of a spoke piece has a complex elastic modulus $E^*_1$ which is set at least 1.5 times a complex elastic modulus $E^*_2$ of the joint portion.

12. The airless tire according to claim 9, wherein each of the first and second curved portions of a spoke piece has a thickness which is set at least 1.5 times a thickness of the joint portion.

13. The airless tire according to claim 2, wherein each of the spoke pieces comprises a spoke outer base extending along the base line between the tread connecting portion and a radially outer edge of the spoke curved portion, and a spoke inner base extending along the base line between the hub connecting portion and a radially inner edge of the spoke curved portion.

14. The airless tire according to claim 2, wherein each of the spoke pieces has a radially outer edge of the spoke curved portion which is set as the tread connecting portion and a radially inner edge of the spoke curved portion which is set as the hub connecting portion.

15. The airless tire according to claim 3, wherein each of the spoke pieces comprises a spoke outer base extending along the base line between the tread connecting portion and a radially outer edge of the spoke curved portion, and a spoke inner base extending along the base line between the hub connecting portion and a radially inner edge of the spoke curved portion.

16. The airless tire according to claim 3, wherein each of the spoke pieces has a radially outer edge of the spoke curved portion which is set as the tread connecting portion and a radially inner edge of the spoke curved portion which is set as the hub connecting portion.

17. The airless tire according to claim 4, wherein each of the spoke pieces comprises a spoke outer base extending along the base line between the tread connecting portion and a radially outer edge of the spoke curved portion, and a spoke inner base extending along the base line between the hub connecting portion and a radially inner edge of the spoke curved portion.

18. The airless tire according to claim 4, wherein each of the spoke pieces has a radially outer edge of the spoke curved portion which is set as the tread connecting portion and a radially inner edge of the spoke curved portion which is set as the hub connecting portion.

19. The airless tire according to claim 9, wherein each of the spoke pieces comprises a spoke outer base extending along the base line between the tread connecting portion and a radially outer edge of the spoke curved portion, and a spoke inner base extending along the base line between the hub connecting portion and a radially inner edge of the spoke curved portion.

20. The airless tire according to claim 9, wherein each of the spoke pieces has a radially outer edge of the spoke curved portion which is set as the tread connecting portion and a radially inner edge of the spoke curved portion which is set as the hub connecting portion.

* * * * *